(12) United States Patent
Niewodniczanski et al.

(10) Patent No.: US 10,579,617 B2
(45) Date of Patent: Mar. 3, 2020

(54) DISPLAYING MESSAGES RELEVANT TO SYSTEM ADMINISTRATION

(71) Applicant: Mimecast North America Inc., Waltham, MA (US)

(72) Inventors: Wawrzyniec Niewodniczanski, Ely (GB); Nathaniel S. Borenstein, Greenbush, MI (US)

(73) Assignee: Mimecast Services Ltd., London (GB)

( * ) Notice: Subject to any disclaimer, the term of this patent is extended or adjusted under 35 U.S.C. 154(b) by 0 days.

(21) Appl. No.: 14/134,099

(22) Filed: Dec. 19, 2013

(65) Prior Publication Data
US 2015/0178349 A1    Jun. 25, 2015

(51) Int. Cl.
  G06F 16/00    (2019.01)
  G06F 16/245   (2019.01)
  G06F 16/248   (2019.01)
  H04L 12/58    (2006.01)

(52) U.S. Cl.
  CPC ......... G06F 16/245 (2019.01); G06F 16/248 (2019.01); H04L 51/046 (2013.01)

(58) Field of Classification Search
  None
  See application file for complete search history.

(56) References Cited

U.S. PATENT DOCUMENTS

| | | | | |
|---|---|---|---|---|
| 6,925,608 B1* | 8/2005 | Neale | ................ | G06F 17/30637 707/E17.062 |
| 2003/0233429 A1* | 12/2003 | Matte | ................ | H04L 12/2803 709/221 |
| 2006/0156077 A1* | 7/2006 | Altaf | .................. | G06F 11/0775 714/57 |
| 2007/0276631 A1* | 11/2007 | Subramanian | ........ | G06F 11/008 702/186 |
| 2010/0064297 A1* | 3/2010 | Doll | ..................... | G05B 19/042 719/315 |
| 2010/0077008 A1* | 3/2010 | Davis | ................ | G06F 17/30011 707/797 |
| 2010/0318855 A1* | 12/2010 | Beg | ........................ | G06F 11/079 714/39 |
| 2013/0007700 A1* | 1/2013 | Villar | ........................ | G06F 8/33 717/109 |
| 2013/0246901 A1* | 9/2013 | Massand | ................. | G06F 17/24 715/229 |

(Continued)

OTHER PUBLICATIONS

Centina Systems, "Product Overview" [online], [retrieved on Dec. 18, 2013]. Retrieved from the Internet: http://www.centinasystems.com/product-overview.php, 5 pages.

(Continued)

*Primary Examiner* — Son T Hoang
(74) *Attorney, Agent, or Firm* — Brown Rudnick LLP; Mark S. Leonardo (57) ABSTRACT

Among other things, in an aspect, a method includes receiving an indication of a condition at a first component of a computer system. The method also includes performing a search of one or more archives that identifies, among artifacts of at least one of the archives, information relevant to the condition. The method also includes displaying, in a user interface, information determined based on at least one of the artifacts in association with a visual representation indication of the condition.

42 Claims, 7 Drawing Sheets

(56) References Cited

U.S. PATENT DOCUMENTS

2015/0066435 A1* 3/2015 Basu .................. H04Q 9/00
702/189

OTHER PUBLICATIONS

Circonus, "Data" [online], [retrieved on Dec. 18, 2013]. Retrieved from the Internet: http://www.circonus.com/why-us/monitoring, 2 pages.
Elasticsearch, "Overview: visualize logs and time-stamped data" [online], [retrieved on Dec. 18, 2013]. Retrieved from the Internet: http://www.elasticsearch.org/overview/kibana/, 7 pages.
Graylog2, "Graylog2: is for data analysis" [online], [retrieved on Dec. 18, 2013]. Retrieved from the Internet: http://graylog2.org/#about, 5 pages.
Wikipedia: "Cacti (software)" [online], [retrieved on Dec. 18, 2013]. Retrieved from the Internet: http://en.wikipedia.org/wiki/Cacti_%28software%29, 4 pages.
Wikipedia: "Ganglia (software)" [online], [retrieved on Dec. 18, 2013]. Retrieved from the Internet: http://en.wikipedia.org/wiki/Ganglia_%28software%29, 3 pages.
Wikipedia: "Nagios [online]," [retrieved on Dec. 18, 2013]. Retrieved from the Internet: http://en.wikipedia.org/wiki/Nagios, 3 pages.
Wikipedia: "Zenoss" [online], [retrieved on Dec. 18, 2013]. Retrieved from the Internet: http://en.wikipedia.org/wiki/Zenoss, 5 pages.

* cited by examiner

FIG. 1

Archive
204

Item 1.docx   Item 2.html   Item 3.msg   Item 4.jpg
202a          202b          202c         202d Item 5.im     Item 6.txt    Item 7.mp3   Item 8.mpg
202e          202f          202g         202h

TO: John Smith <john@smith.com>  — 602
FROM: Alert Server <alert@server.com>  — 604
SUBJECT: ALERT - High Load at MUK04-3!  — 606

ALERT - High Load at MUK04-3!  — 608

Important Documents:

Strange behavior of MUK04-3 [EMAIL]  — 610
- stared: 2 months ago
- last change: 2 weeks ago
- active: DL-SysAdmins, Bob Feder, Gianno Buccinio, Greg Kucinski What to do when one Mail node is under fire [JIRA]
- started: 3 months ago,
- last change: 2 weeks ago
- active: Bob Feder, Mike Wu Suggestions:
- "When I restarted MTA-5.0 at MFR04-3, load went down."  — 612
  <show documents>
- "When need to speak with SPAM-DEV. Seems that spam checks can kill disks."
  <show documents>

DISPLAYING MESSAGES RELEVANT TO SYSTEM ADMINISTRATION

BACKGROUND

This description relates to displaying messages relevant to system administration. Computers can be used to monitor and manage other computer systems in various ways by one or more system administrators.

SUMMARY

The system administration systems and methods that we describe here may encompass one or more of the following (and other) aspects, features, and implementations, and combinations of them.

In general, in an aspect, a method includes receiving an indication of a condition at a first component of a computer system. The method also includes performing a search of one or more archives that identifies, among artifacts of at least one of the archives, information relevant to the condition. The method also includes displaying, in a user interface, information determined based on at least one of the artifacts in association with a visual representation indication of the condition.

Implementations of this aspect may include one or more of the following features. The method includes identifying a facility at which a system administrator accesses notifications of conditions experienced by a system designated as managed by the system administrator, the facility being associated with the user interface, receiving at least one notification designated for delivery to the facility, and providing, the information determined based on the at least one artifact to the facility in association with the at least one notification. The facility includes an electronic message system and the user interface comprises an electronic message. The user interface includes a first portion that includes information relevant to the condition, and a second portion that includes the information determined based on the at least one artifact. At least some of the identified artifacts include content describing a previous instance of the condition experienced by the first component. The method includes identifying, among the artifacts relevant to the condition, an artifact identified as containing information describing how the condition was resolved during the previous instance of the condition. The search that identifies artifacts relevant to the condition identifies artifacts relevant to an instance of the condition experienced by a second component, the second component being identified as matching at least one similarity criterion to the first component. The method includes generating a search query based on keywords identified as relevant to the indicated condition. The method includes submitting the search query to a search facility that searches the one or more archives. The method includes displaying, in the user interface, a visual representation of the search query, the visual representation enabling a modification of the keywords of the search query. The method includes displaying, in the user interface, controls that enable a user to save and recall the search query. At least some of the identified artifacts include documentation describing the first component. The method includes displaying, in the user interface, one or more users identified as associated with at least some of the artifacts. An electronic message indicates the condition. The electronic message is an email message, a social media message, or an instant message. A telephone communication indicates the condition. At least one of the archives is accessed using the Internet. The method includes detecting the condition using a detection mechanism to determine the indication, and where the indication is received from the detection mechanism.

In general, in another aspect, a computer readable storage device storing a computer program product includes machine-readable instructions that, when executed, cause a computer system to carry out operations including receiving an indication of a condition at a first component of a computer system. The operations also include performing a search of one or more archives that identifies, among artifacts of at least one of the archives, information relevant to the condition. The operations also include displaying, in a user interface, information determined based on at least one of the artifacts in association with a visual representation indicating the condition.

Implementations of this aspect may include one or more of the following features. The operations include identifying a facility at which a system administrator accesses notifications of conditions experienced by a system designated as managed by the system administrator, the facility being associated with the user interface, receiving at least one notification designated for delivery to the facility, and providing, the information determined based on the at least one artifact to the facility in association with the at least one notification. The facility includes an electronic message system and the user interface comprises an electronic message. The user interface includes a first portion that includes information relevant to the condition, and a second portion that includes the information determined based on the at least one artifact. At least some of the identified artifacts include content describing a previous instance of the condition experienced by the first component. The operations include identifying, among the artifacts relevant to the condition, an artifact identified as containing information describing how the condition was resolved during the previous instance of the condition. The search that identifies artifacts relevant to the condition identifies artifacts relevant to an instance of the condition experienced by a second component, the second component being identified as matching at least one similarity criterion to the first component. The operations include generating a search query based on keywords identified as relevant to the indicated condition. The operations include submitting the search query to a search facility that searches the one or more archives. The operations include displaying, in the user interface, a visual representation of the search query, the visual representation enabling a modification of the keywords of the search query. The operations include displaying, in the user interface, controls that enable a user to save and recall the search query. At least some of the identified artifacts include documentation describing the first component. The operations include displaying, in the user interface, one or more users identified as associated with at least some of the artifacts. An electronic message indicates the condition. The electronic message is an email message, a social media message, or an instant message. A telephone communication indicates the condition. At least one of the archives is accessed using the Internet. The operations include detecting the condition using a detection mechanism to determine the indication, and where the indication is received from the detection mechanism.

In general, in another aspect, a system includes a computer system configured to display, in a user interface, information determined based on at least one artifact in association with a visual representation indication of a condition, the at least one artifact having been identified in response to a search of one or more archives that identifies, among artifacts of at least one archive, information relevant to a condition at a first component of a computer system.

Implementations of this aspect may include one or more of the following features. The system is configured to identify a facility at which a system administrator accesses notifications of conditions experienced by a system designated as managed by the system administrator, the facility being associated with the user interface, receive at least one notification designated for delivery to the facility, and provide, the information determined based on the at least one artifact to the facility in association with the at least one notification. The facility includes an electronic message system and the user interface comprises an electronic message. The user interface comprises a first portion that includes information relevant to the condition, and a second portion that includes the information determined based on the at least one artifact. At least some of the identified artifacts include content describing a previous instance of the condition experienced by the first component. The system is configured to identify, among the artifacts relevant to the condition, an artifact identified as containing information describing how the condition was resolved during the previous instance of the condition. The search that identifies artifacts relevant to the condition identifies artifacts relevant to an instance of the condition experienced by a second component, the second component being identified as matching at least one similarity criterion to the first component. The system is configured to generate a search query based on keywords identified as relevant to the indicated condition. The system is configured to submit the search query to a search facility that searches the one or more archives. The system is configured to display, in the user interface, a visual representation of the search query, the visual representation enabling a modification of the keywords of the search query. The system is configured to display, in the user interface, controls that enable a user to save and recall the search query. At least some of the identified artifacts include documentation describing the first component. The system is configured to display, in the user interface, one or more users identified as associated with at least some of the artifacts. An electronic message indicates the condition. The electronic message is an email message, a social media message, or an instant message. A telephone communication indicates the condition. At least one of the archives is accessed using the Internet. The system is configured to detect the condition using a detection mechanism.

These and other aspects, features, and implementations, and combinations of them, may be expressed as apparatus, methods, methods of doing business, means or steps for performing functions, components, systems, program products, and in other ways.

Other aspects, features, and advantages will be apparent from the description and the claims.

DESCRIPTION

A system administrator may use a user interface that identifies conditions of systems under control of the administrator. Further, an archive may store artifacts (e.g., messages, documents, or any other kind of data or portion of data) that are relevant to the condition. For example, the system administrator may have previously received communications such as email messages pertaining to the component experiencing the problem and/or the particular problem being experienced. As another example, messages or documents may exist on the system but have never been shown to the administrator (e.g., because they belong to another user). The user interface can display artifacts identified as relevant to the condition in a format useful to the system administrator. For example, the artifacts could be displayed in the format in a manner that could be useful in analyzing the condition. If the condition is a problem, the artifacts may be useful to the system administrator in diagnosing the problem, e.g., as an annotation to the messages that alert the administrator to the problem.

In some implementations, the user interface identifies relevant artifacts using a search engine. The search engine may be a part of the user's local system, one or more remote systems, a cloud system, or another kind of system. The search engine and the user interface may be on the same system, or may each be on a different system. In some implementations, the search engine is on a different system than the user interface, and information form the search engine is transmitted to the user interface for display. In some implementations, the search engine is operated by a third party, for instance, an independent search vendor or provider. The search engine may be available to a large number of users, e.g., if the search engine is a public search engine available on the Internet.

When we use the term system, we mean it in a very broad sense, to include, for example, any computing device or combination of devices that is used by one or more users. For instance, a system may include a desktop computer, laptop computer, cellular phone, smartphone, tablet computer, server, cloud system, gaming system, or any other computing device.

When we use the term condition, we mean it in a very broad sense, to include, for example, any instant (current) or historical (previous) property, state, characteristic, or condition of a system. For instance, the condition of a system may include information about its functional state (e.g., if the system is functioning properly or abnormally) and its power state (e.g., if the system is on, off, in a lower power state, "sleeping", "hibernating", or in a "stand-by mode"), either of the system as a whole or of one or more components of the system. The condition of a system can also include performance characteristics, for instance performance characteristics related to memory (e.g., the amount of memory that is being used or is available for use), storage (e.g., the amount of storage space that is being used or is available for use, described as absolute values or as a space usage percentage), networking (e.g., the rate at which data is being transferred to and from the system), system utilization (e.g., the processing capacity of the system that is being utilized to perform a task), or any other characteristic related to the instant or historical performance of a system. The condition of the system can also include a rate of change of a performance characteristic (e.g., the rate at which storage space usage changes during a given period of time). The condition of a system can also include relatively static information, for instance identifying information of the system (e.g., model and/or serial numbers or other descriptive information about the system or its constituent components), specifications (e.g., specifications of the system or its constituent components), user information (e.g., identifying information about the user, owner, operator, administrator, or other entity related to the system), or other such information.

When we use the term artifact, we mean it in a very broad sense, to include, for example, any portion or fragment of data, e.g., that forms an electronic communication. A file management application enables a user to access, manipulate, share and in other respects to use artifacts. We refer to any of these types of activities and to any other use of artifacts broadly as "interacting" with or "using" artifacts. Any portion of data, such as any portion of an electronic communication, can be an artifact. Anything sent and received by a user of one of the applications can be an artifact.

For example, an email message is an artifact. An email message typically has a topic (sometimes denoted by a "subject" field) and contains content written by a user about the topic. An email message can also relate to multiple topics. A portion that is less than all of an email can also be an artifact.

An email message has at least one recipient, and may have many recipients who are either individual users or groups of users (e.g., a mailing list of users). An email message could also contain multiple artifacts. For example, one portion of an email message body could be an artifact, and another portion (e.g., a portion relating to a different topic) could be a different artifact. An attachment to the email message could be yet another artifact, as could an in-line image within the email message.

As another example, a posting on a social networking service (e.g., a posting on a public or internal/private social networking service), or a portion of a posting, is an artifact. A posting on a social networking service is typically composed by a user and relates to a topic of interest by the user. The posting may be available to all other users linked to the user, or the posting may be available to only select users, or the posting may be available to all users of the social networking service, or the posting may be available to some other category or categories of users.

As another example, a portion of a real-time conversation is an artifact. For example, a real-time communication system, such as an instant messaging system that enables users to exchange short messages in real time, may be used to facilitate and record a series of messages related to a topic or multiple topics being discussed by users of the instant messaging system. The conversation may be held between two or more users; i.e., two or more users may participate in a single conversation, sometimes referred to as a single session. A transcript of messages exchanged in a single session may include one or more artifacts. Each message may be an artifact, a portion of the conversation (e.g., a portion relevant to a particular topic), or the entirety of the conversation may be an artifact.

As another example, data stored as files on a file system are artifacts. Data may include one or more types of information, such as textual data (e.g., text documents such as letters, memos, reports, tables, spreadsheets, etc.), image data (e.g., photographs, illustrations, charts, etc.), audio data (e.g., recorded music, speech, and other auditory information), video data, or combinations of one or more types of information (e.g., illustrated documents, multimedia presentations, annotated videos, webpages, wiki pages, etc.) Files may be stored individually on a file system, or may be stored in combination with other files in one or more file repositories or archives.

As another example, data from issue tracking systems, customer relationship management systems, or other business applications are artifacts. For instance, artifacts can include support tickets and bug reports from an issue tracking system. In another example, artifacts can include data relating to business arrangements between a company and its customers (e.g., information regarding existing or expected contracts to provide service or support).

Other types of data that can be artifacts include syndication feeds (e.g., RSS feeds), voice data or other kinds of audio (e.g., recorded telephone calls, voice messages such as voicemail, transcripts of a spoken conversation, audio feeds, etc.), and video (recorded video calls, video mail or video messages, security cameras, video feeds, etc.).

When we use the term cloud system, we mean it in a very broad sense, to include, for example, any remote system of storing, maintaining, and processing data. For example, in some examples a cloud system may be a computing device such as a server or a data storage facility that includes multiple servers. The cloud system may be any other kind of system that can store, send, and receive data.

When we use the term archive, we mean it in a very broad sense, to include, for example, any grouping of one or more artifacts. In some implementations, an archive is a collection of artifacts stored according to a particular storage structure. For example, an archive may be a collection of artifacts stored within one or more container files (e.g., compressed container files, uncompressed container files, or a combination of compressed and uncompressed container files). In another example, an archive may be one or more directories containing one or more artifacts. In another example, an archive may be a combination of one or more directories, and one or more container files. In some implementations, archives may be stored on one or more storage facilities.

Figure 1:
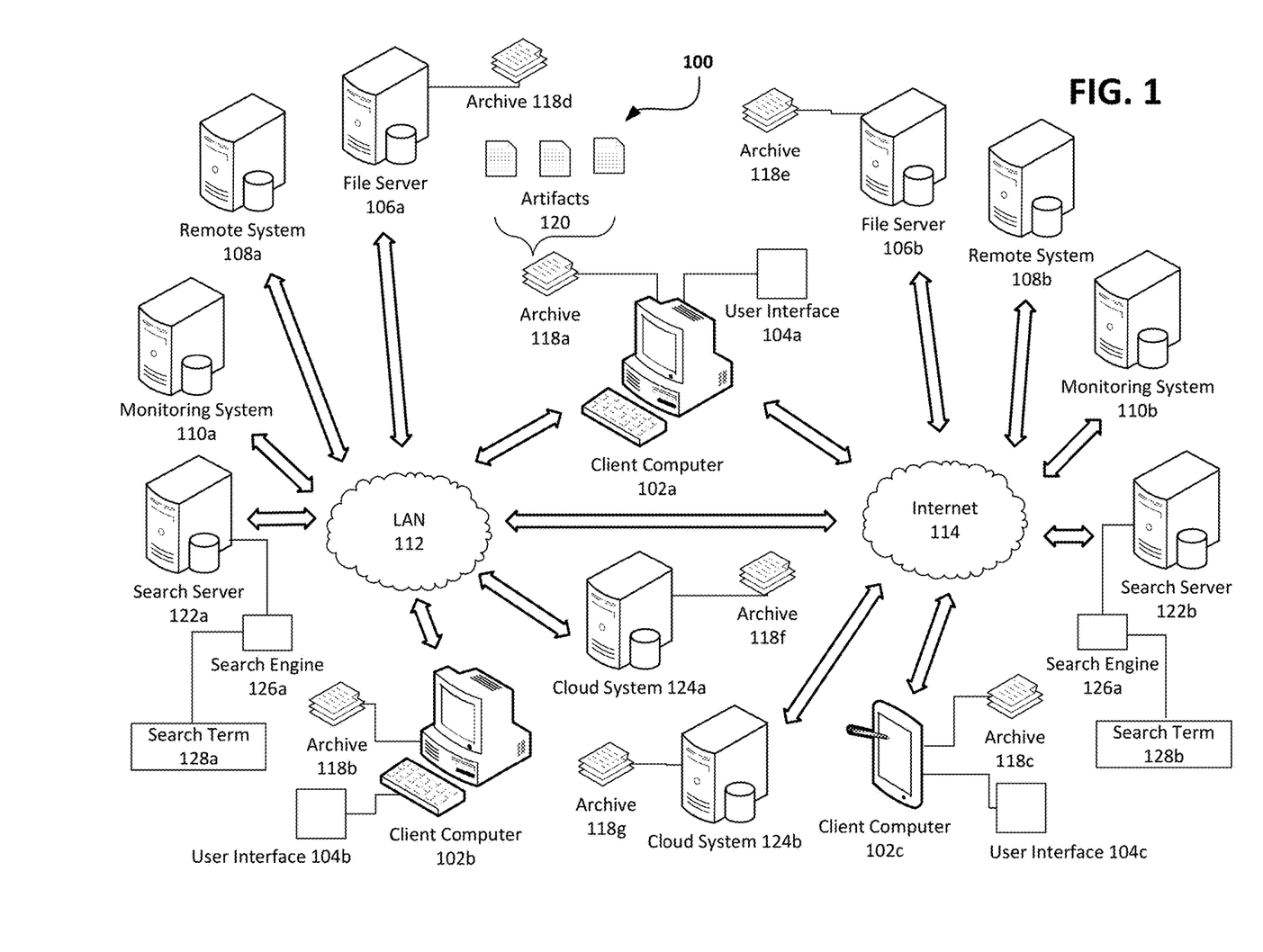
FIGS. 1, 2, and 7 are block diagrams.

FIG. 1 is a block diagram of a system 100 that allows users to identify conditions of systems under the control of the administrator, and to view one or more artifacts relevant to the conditions. A user interacts with a user interface 104a-c of one or more client computers 102a-c to identity conditions of one or more systems, for instance conditions of other client computers 102a-c, file servers 106a-b, remote systems 108a-b, monitoring systems 110a-b, and cloud systems 124a-b. The user interface 104a-c is presented and/or rendered on a corresponding client computer 102a-c, but can be implemented locally (e.g., through the execution and/or rendering of locally stored assets), remotely (e.g., through the execution and/or rendering of remotely stored assets), or a combination of the two. Assets can be, for example, instructions, images, text, files, or other data that are used to present or render a user interface 104a-c. Example user interfaces 102a-c include a webpage rendered from locally stored assets, a webpage rendered from remotely stored assets, a text-based interface (e.g., input and output displayed a command line), or an interface rendered based on the execution of computer code.

The client computers 102a-c, file servers 106a-b, remote systems 108a-b, monitoring systems 110a-b, and cloud systems 124a-b may be networked to the user's client computer 102a-c, for instance through a local area network (LAN) 112 or through a wide area network (WAN), such as the Internet 114. Other types of networks can also be used, for instance a telephone network (cellular and/or wired), Bluetooth network, near field communications (NFC) network, or other network capable of transmitting data between interconnected systems. In some implementations, two or more networks may be interconnected, such that systems connected to one network can communicate with systems connected to another network. In an example, systems connected to the LAN 112 can communicate with systems connected to the Internet 114, and vice versa.

In some examples, the client computers 102a-c directly monitor one or more systems. For instance, the client computers 102a-c may transmit and receive data from one or more systems relating to the condition of each of the systems. As an example, the client computer 102a can communicate to the file server 106a through the LAN 112 in order to receive data describing the condition of the file server 106a. In another example, the client computer 102a can communicate to the remote system 108b through the Internet 114 and to the client computer 102b in order to receive data describing the condition of the remote system 108b and the client computer 102b, respectively. The client computer 102a can display some or all of the received data to the user through the user interface. In an example, the client computer 102a displays information pertaining to the conditions of the file server 106a, the remote system 108b, the client computer 102b to the user by way of the user interface 104a.

In some implementations, other systems may monitor one or more systems, and information pertaining to the conditions of the monitored systems is transmitted to one or more of the client computers 102a-c. For instance, a monitoring system 110a-b can monitor other systems. In an example, a monitoring system 110a communicates to the file server 106a through the LAN 112 in order to receive data describing the condition of the file server 106a. In another example, the monitoring system 110a communicates to the remote system 108b through the LAN 112 and the Internet 114 in order to receive data describing the condition of the file server 108b.

After receipt of this data, the monitoring system 110a can detect the condition of the monitored system, and can transmit an indication of the condition and/or a portion of or all of the received data to a client computer 102a-c for display to the user. This data can be transferred continuously, periodically, or intermittently. In some implementations, data can be sent in a discrete message, for instance as a part of an instant message, e-mail message, SMS message, electronic notification, telephone message, or other type of message. In an example, the monitoring system 110a transmits data describing the condition of the file server 106a to the client computer 102a by way of the LAN 112, and a portion of or all of this data is displayed to the user on the user interface 104a. In some implementations, the monitoring system 110a-b continuously sends condition data to the client computer 102a-c. In some implementations, the monitoring system 110a-b sends condition data to the client computer 102a-c periodically. In some implementations, the monitoring system 110a-b sends condition data to a particular client computer 102a-c based on certain criteria. Examples of criteria include the identity of a user, the day and time, the date, the system being monitored, the condition of the system, an indication from a user whether he would like monitoring data, or other criteria. The criteria can be revised as desired by a user. In an example, a user can revise the criteria such that on a weekend, data is transmitted from the monitoring system 110a to a client computer 102a only when it detects a severe condition (e.g., a disabled state), while on a weekday, all monitoring data is transmitted from the monitoring system 110a to all of the client computers 102a-c. In this manner, the transmission and display of data can be customized as desired so that the user is notified of important information according to her specified criteria.

In some implementations, the monitoring system 110a-b processes the condition data before transmitting it to a client computer 102a-c. Examples of processing can include formatting the data so that it is more readily understood by a user (e.g., by producing charts with instant and/or historical data trends), filtering the condition data so that only select data is transmitted (e.g., filtering the condition data to include only data that is of a particular relevance or importance).

In addition to displaying condition data, the user interface 104a-c displays one or more artifacts that are relevant to the condition data. These relevant artifacts can include, for example, documentation pertaining to a particular component or system (e.g., a product manual), troubleshooting information, content describing past experiences (e.g., a description of a prior instance of the condition and how the condition was resolved), relevant communications between users, or other artifacts that are relevant to the condition data. The user interface 104a-c may display artifacts that are stored on a locally stored archive and/or artifacts that are stored on remotely stored archives. In an example, the user interface 104a may display an artifact 120 from an archive 118a stored locally on the client computer 102a, an archive 118d stored remotely on the file server 106a, and an archive 118e stored on the file server 106b.

In some examples, user interface 104a-c displays artifacts that are relevant to the condition data. Relevant artifacts may be determined by the local client computer 102a, a search server 122a-b, a monitoring system 110a-b, or a combination of two or more systems. In an example, a user interface 104a displays artifacts that are relevant to the condition data based on a determination made by the client computer 102a. In another example, the user interface 104a displays artifacts based on a determined made by search servers 122a and/or search servers 122b. Search servers 122a-b may search through one or more archives 118a-g in order to identify artifacts relevant to the condition data. For example, the search servers 122a-b may execute a search engine 126a-b that takes a search query 128a-b as input. The search query can be determined in various ways, for instance by parsing and interpreting condition data in order to identify key words or phrases that are relevant to the condition data. Information about the identified artifacts is transmitted to the user interface 104a for display to the user.

In some examples, a search query is determined by a simple keyword frequency analysis of the condition data. For example, the search query can be formed based on identifying keywords that appear more than a pre-determined number of times. In some examples, a search query is determined by a relative frequency analysis of the data. For example, the search query can be formed based on identifying keywords that appear more than usual relative to other words in the data. In some examples, a search query can be based on the time and/or day. For example, the search query can be formed based on identifying keywords that appear more than usual for a particular time and/or day. In some examples, a search query is based off of a list of pre-determined terms. This list can be maintained manually by one or more users, or can be maintained automatically. For example, the list can be maintained from a list of recent changes to documentation of code. In some examples, a search query is based on information about relevant systems. For example, the search query can be formed to include a system's hostname, IP address, model number, identifying information about a component, and other types of data that can be used to identify a system or represent an identity of the system. In some examples, a search query is based on keywords in the documentation, code, reports, or other supporting information of the monitor system. In some examples, a search query is based on keywords that were saved from previous searches.

In some examples, systems may store one or more archives 118a-g that contain one or more artifacts 120. For instance, the client computer 102a can store an archive 118a which contains artifacts 120. In another example, the client computer 102b can store an archive 118b and the client computer 102c can store an archive 118c. In another example, the file server 106a can store an archive 118d and the file server 106b can store an archive 118e. Each of these artifacts can contain one or more artifacts. In some implementations, some or all of the archives 118 and its constituent artifacts can be accessed by other systems, for instance by other systems communicatively networked through the LAN 112 or the Internet 114.

Further, archives can be stored on one or more "cloud" systems. For example, an archive 118f can be maintained on a cloud system 124a, and an archive 118g can be maintained on a cloud system 124b. The cloud system 124 may be communicatively networked to client computers 102, for example using communications routed by way of the LAN 112 or the Internet 114. The cloud system 124 may also be networked to client computers 102, either additionally or alternatively, through a separate LAN or WAN communication connection.

In some examples, a cloud system need not be located locally to a client's system, nor under direct control of a client. For instance, a cloud system may be located at a physical location under the control to a third party service provider, rather than located at a physical location under the control of a client. If a cloud system is a distributed system including multiple servers, then the cloud system may be located at several physical locations, at least some of which may be under the control of a third party, or the client, or a combination of the two. In some examples, the cloud system or portions of the cloud system could be located at one or more physical locations that are hundreds or thousands of miles away from any resource of a client.

In some implementations, a portion of the cloud system may be operated by an entity other than a service provider directly contracted by a client. For example, a service provider may hire a subcontractor to maintain a portion of the cloud system. In some implementations, a service provider has control over the entire cloud system, including portions operated by another entity.

Figure 2:
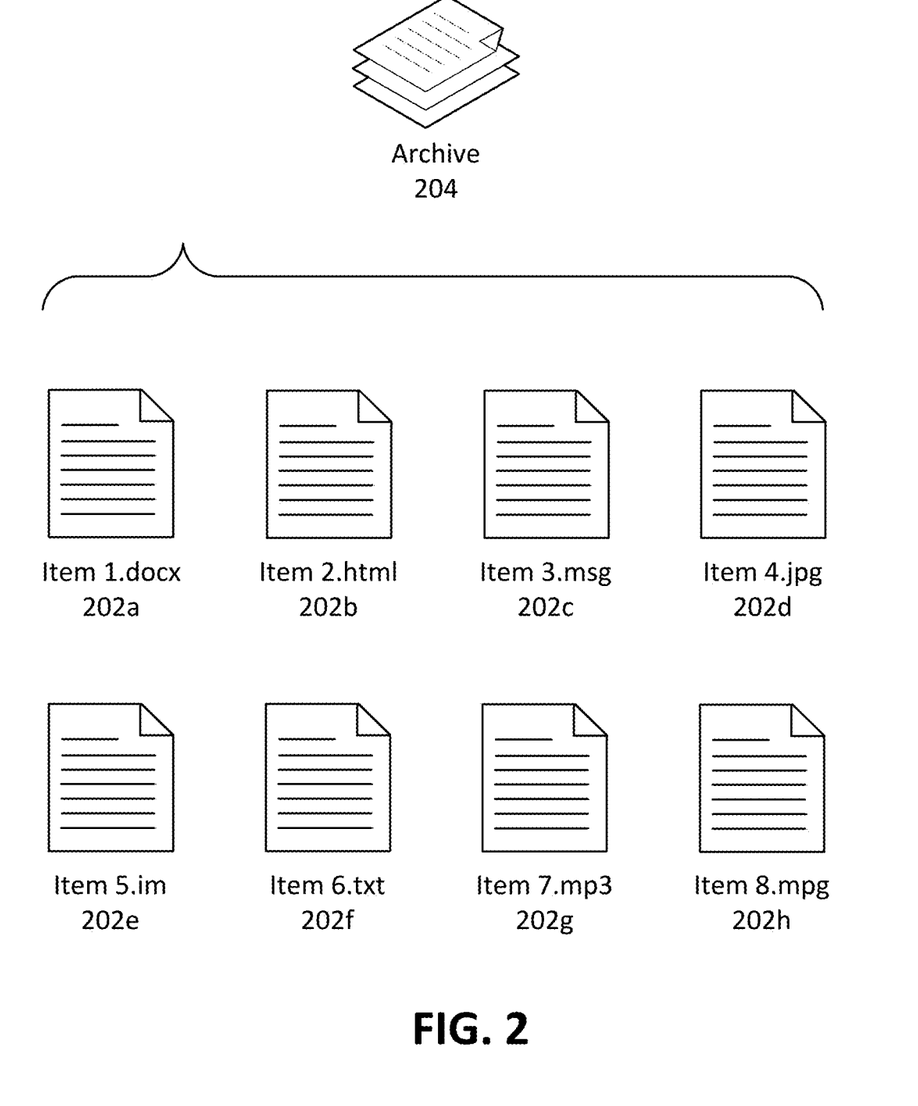

In some examples, one or more artifacts can be stored within one or more archives on one or more storage facilities. FIG. 2 shows an example of eight artifacts 202a-h stored within an archive 204. Several different types of artifacts may be stored within the same archive (or a collection of related archives). For example, the archive 204 includes artifacts of differing file types, including documents (202a), web pages (202b), e-mail messages (202c), images (202d), instant messages (202e), plain text (202f), audio (202g), and videos (202h). Artifacts 202a-h can include information in the form of text, images, audio, video, or a combination of two or more types of information (i.e., text with images, video with audio, text with video and audio, and so forth).

Figure 3:
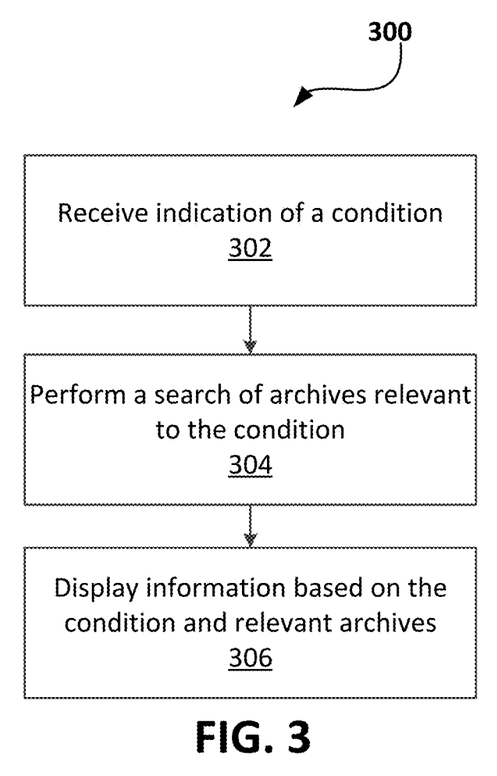
FIGS. 3 and 5 are flowcharts.

FIG. 3 shows an example process 300 for identifying conditions of systems and displaying one or more artifacts relevant to the conditions. For example, the process 300 could be carried out by a system of the system 100 (e.g., a client computer 102a-c or a monitoring system 110a) that monitors one or more other systems of the system 100 (e.g., file servers 106a-b, remote systems 108a-b, cloud systems 124a-b, client computers 102a-c, and so forth), and receives indications of conditions of these systems 302, as described above.

A search is performed 304 in order to identify artifacts relevant to the condition. For example, the search can be performed by a client computer 102a-c, a search server 122a-b, a monitoring system 110a-b, or a combination of two or more systems, as described above. Relevant artifacts can include, for example, documentation pertaining to a particular component or system (e.g., a product manual), troubleshooting information, content describing past experiences (e.g., a description of a prior instance of the condition and how the condition was resolved), relevant communications between users, or other artifacts that are relevant to the condition data.

Information about the condition and the relevant archives is displayed 306 to the user. For example, information can be displayed 306 on a user interface 104a-c, and can be viewed by a user using a client computer 102a-c, as described above. The displayed information can be formatted so that the information is more readily understood by the user and/or filtered so that only select data is displayed. In an example, all information about the condition and the relevant artifacts is displayed so that the user can view all of the available information. In another example, only a portion of the information about the condition and the relevant artifacts is displayed so that the user can review an excerpted portion of the information more easily.

Figure 4:
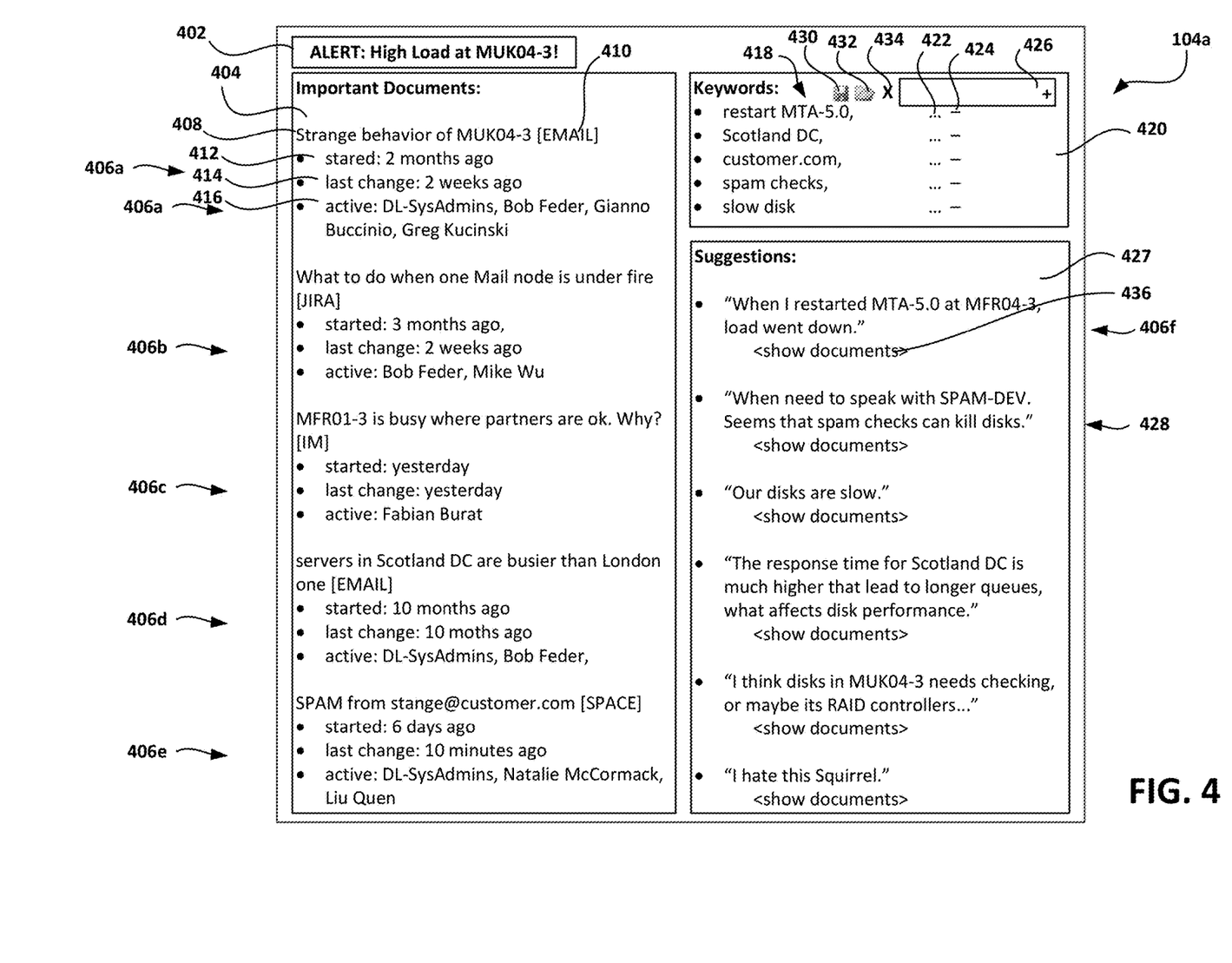
FIG. 4 is an example user interface.

FIG. 4 shows an example of a user interface 104a used to display condition data and one or more artifacts that are relevant to the condition data. The user interface 104a can display the condition data of one or more systems in a condition data field 402. The condition data field 402 can display all of the condition data, or it can display only a portion of the condition data. For instance, in some implementations, the condition data field 402 displays all of the condition data, such that a user can review the condition of all of the systems being monitored. In some implementations, the condition data field 402 can display a portion of the condition data, such that only particularly relevant information is displayed to the user (e.g., information that is above a relevance threshold). The relevance of the information can be determined, for example, by one or more systems of the system 100 (e.g., client computers 102a-c, monitoring systems 110a-b, or search servers 122a-b). For instance, in some implementations, the condition field 402 displays condition data corresponding only to a subset of all of the monitored systems. This subset can be based on user specified criteria (e.g., a user selection of systems and/or conditions that she wishes to monitor), a system specified criteria (e.g., a pre-determined selection of systems and/or conditions to be monitored), or a combination of user and system specified criteria. In some implementations, the condition field 402 displays condition data corresponding to, for example, abnormal or unexpected behavior of one or more monitored systems.

The user interface 104a can also display information corresponding to one or more artifacts that are relevant to the condition data. For instance, in some implementations, the user interface 104a displays information about relevant artifacts in an artifact field 404. The artifact field 404 can identify one or more artifacts, for instance the artifacts 406a-e. These artifacts 406a-e can be identified from among other artifacts, for example, by the search engine 126a-b on the search server 122a-b using one or more search terms 128a-b.

In some implementation, the artifact field 404 can also display additional information about each artifact. For instance, in some implementations, the artifact field 404 can display metadata (e.g., data describing attributes of the data that makes of the artifact) such as the title of the artifact 408, the file or data type of the artifact 410, creation information 412 describing when the artifact was created or started, modification information 414 describing when the artifact was last modified, and user information 416 describing one or more users associated with the artifact. The user information 416 can describe, for example, users who created or modified the artifact, users who were recipients of the artifact (e.g., users who received an e-mail or instant message artifact), or users who are responsible for the contents of the artifact. Other information about each artifact can also be displayed, either additionally or alternatively. For instance, other information can include key words, summaries or abstracts, relevance metrics (e.g., a relevance score determined by a search engine), file size, an indication of where the artifact is being stored, or other information relating to each artifact and its contents.

A user can access the one or more artifacts 406a-e using the user interface 104a. For instance, a user can select a portion of the artifact field 404 that corresponds to a desired artifact in order to access and display the artifact. As an example, the user can select the title 408 of the artifact 406a in order to access the artifact 406a. In some implementations, the user can initiate communications with other users using the user interface 104a. For instance, in some implementations, the user can select one or more users of the user information 416 in order to initiate an e-mail message, instant message, telephone connection, or other communications message to the selected users.

In some implementations, the user interface 104a can also include a keyword field 420 that displays key descriptors 418 that are related to the condition data. These key descriptors 418 can be, for example, words, terms, and/or phrases that are relevant on the condition data. In some implementations, the key descriptors 418 are chosen in a similar manner as determining search queries. For instance, the key descriptors 418 can be the terms used in a search query. In some implementations, the key descriptors 418 can be words, terms, and/or phrases that indicate general domains that are relevant to the system and/or condition. For example, the key descriptors 418 can be broad descriptors that indicate general categories or classifications that pertain to the system and/or condition. In an example, if the condition relates to a hardware-related networking problem, the key descriptions 418 can include terms such "hardware" and "networking." In some implementations, the key descriptors 418 are used to conduct a search for relevant artifacts for display in the artifact field 404. For example, the key descriptors 418 can be used as search terms 128a-b in order to conduct a search using a search engine 126a-b. In some implementations, a user can add, delete, or modify the key descriptors 418 in order to refine the search. In an example implementation, the user can modify a key descriptor 418 by selecting an edit option 422, remove a key descriptor 418 by selecting a remove option 424, or add an additional key descriptor 418 by selecting an add option 426. A new search can be conducted after each revision to the key descriptors 418. In some implementations, the set of key descriptions 418 can be saved for future consideration. In an example implementation, the user can save the present set of key descriptors 418 by selecting a save option 430, load a previously saved set of key descriptors 418 by selecting a load option 432, and delete the present list of key descriptors 418 by selecting a delete option 434.

In some implementations, the user interface 104 can also include a suggestion field 427 that displays suggestions 428 to the user that are related to the condition data. The suggestions 428 are made based on the current state of knowledge of the system, and can include, for example, information related to recommended actions that the user can perform in response to the condition data (e.g., to maintain a monitored system or to diagnose and/or resolve an abnormal condition of a monitored system). Example recommended actions include recommended corrective or preventative tasks for the user to perform, recommended search queries for the user to conduct, recommended users with whom the user can further discuss the condition, and so forth. In some implementations, the suggestions 428 can include information from one or more artifacts. For example, the suggestions 428 can include relevant portions of information from one or more artifacts (e.g., excerpts of textual information, selected images, selected video, and so forth). These excerpts or portions can be identified in various ways. For example, in some implementations, excerpts can be identified based on the results of search queries, for instance as described above. In some implementations, suggestions can be based on previously conducted search queries, alerts, saved key descriptors, and/or current or previous actions of other users.

In additional to viewing the suggestions 428, the user can also access the source artifact corresponding to each suggestion 428. For example, a user can select a view option 436 in order to access and display the artifact 406f.

In some examples, condition data and one or more artifacts that are relevant to the condition data can be sent to a user in one or more discrete messages, for instance as a part of one or more instant messages, e-mail messages, SMS messages, electronic notifications, telephone messages, or other type of messages. The message can be created by one or more systems of the system 100, for example by a client computer 102a-c and/or a monitoring system 110a-b.

Figure 5:
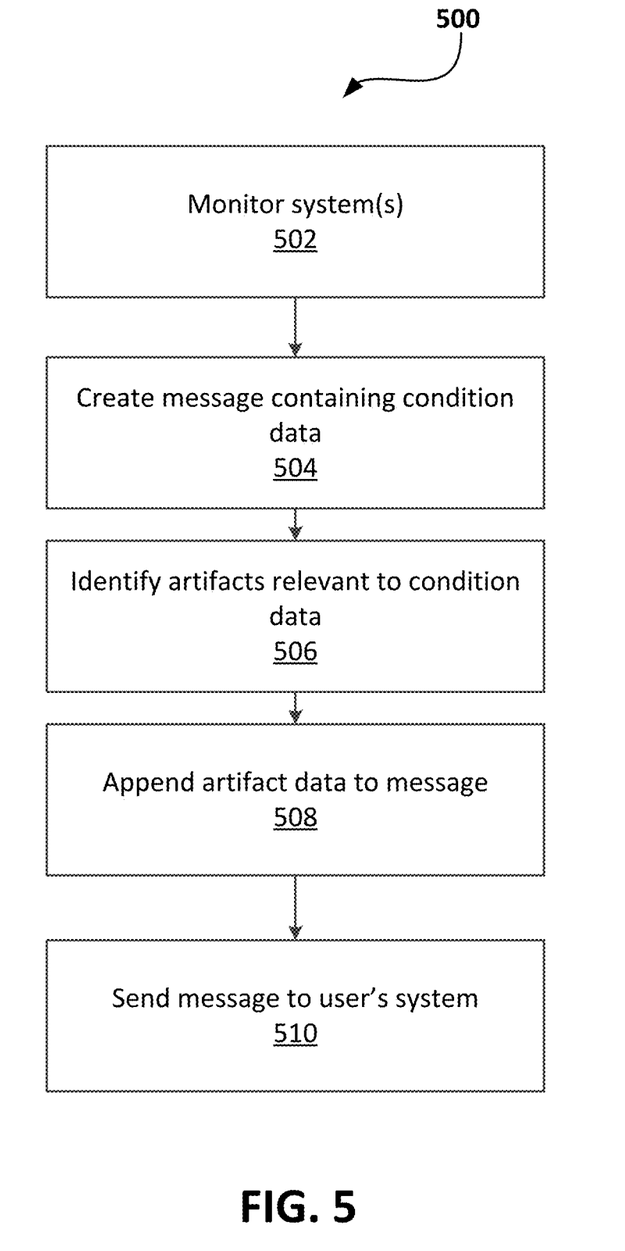

FIG. 5 shows an example process 500 for sending messages to a user. For example, the process 500 could be carried out by a system of the system 100 (e.g., a client computer 102a-c or a monitoring system 110a) that monitors 502 one or more other systems of the system 100 (e.g., file servers 106a-b, remote systems 108a-b, cloud systems 124a-b, client computers 102a-c, and so forth), as described above.

A message is created 504 that contains a portion of or all of this condition data. The message can include, for example, the entirety of the condition data or a portion of the condition data. The condition data can be formatted such that it is more readily understood by the user (e.g., summarized, highlighted, labeled, provided with contextual descriptors, and so forth), or to conform to particular message formats or protocols (e.g., to conform to limitations regarding message length, text formatting, visual layout, and so forth).

The system 100 identifies 506 one or more artifacts that are relevant to the condition data. This can be determined, for example, by the local client computer 102a, a search server 122a-b, a monitoring system 110a-b, or a combination of two or more systems, as described above.

The system 100 then appends 508 a portion of or all of the identified artifacts to the message. The appended information can include, for example, the entirety of the artifacts or a portion of the artifacts. The appended information can be formatted such that it is more readily understood by the user (e.g., summarized, highlighted, labeled, provided with contextual descriptors, and so forth), or to conform to particular message formats or protocols (e.g., to conform to limitations regarding message length, text formatting, visual layout, and so forth). In some implementations, the appended information also includes information that can be used to access the artifact, for example information regarding the storage location of the artifact and/or a "shortcut" or "hyperlink" that directs the user to the storage location.

The system 100 then sends 510 the message to the user's system. In some implementations, the system 100 identifies the user's system (e.g., a client computer 102a-c) based on a pre-determined list, for example a list of systems corresponding to the user. In some implementations, the system 100 identifies the user's system based on the user's usage, for example by identifying systems that the user is actively using. This can be determined, for instance, by identifying systems that the user is currently logged into, by identifying systems that the user is actively interacting with, or according to other techniques. The system 100 can send the message in various ways, for instance by transmitting the message to an appropriate communications node, such as an e-mail server, a SMS gateway, a telephone gateway, or other component that can transmit the message to the user's system.

Figure 6:
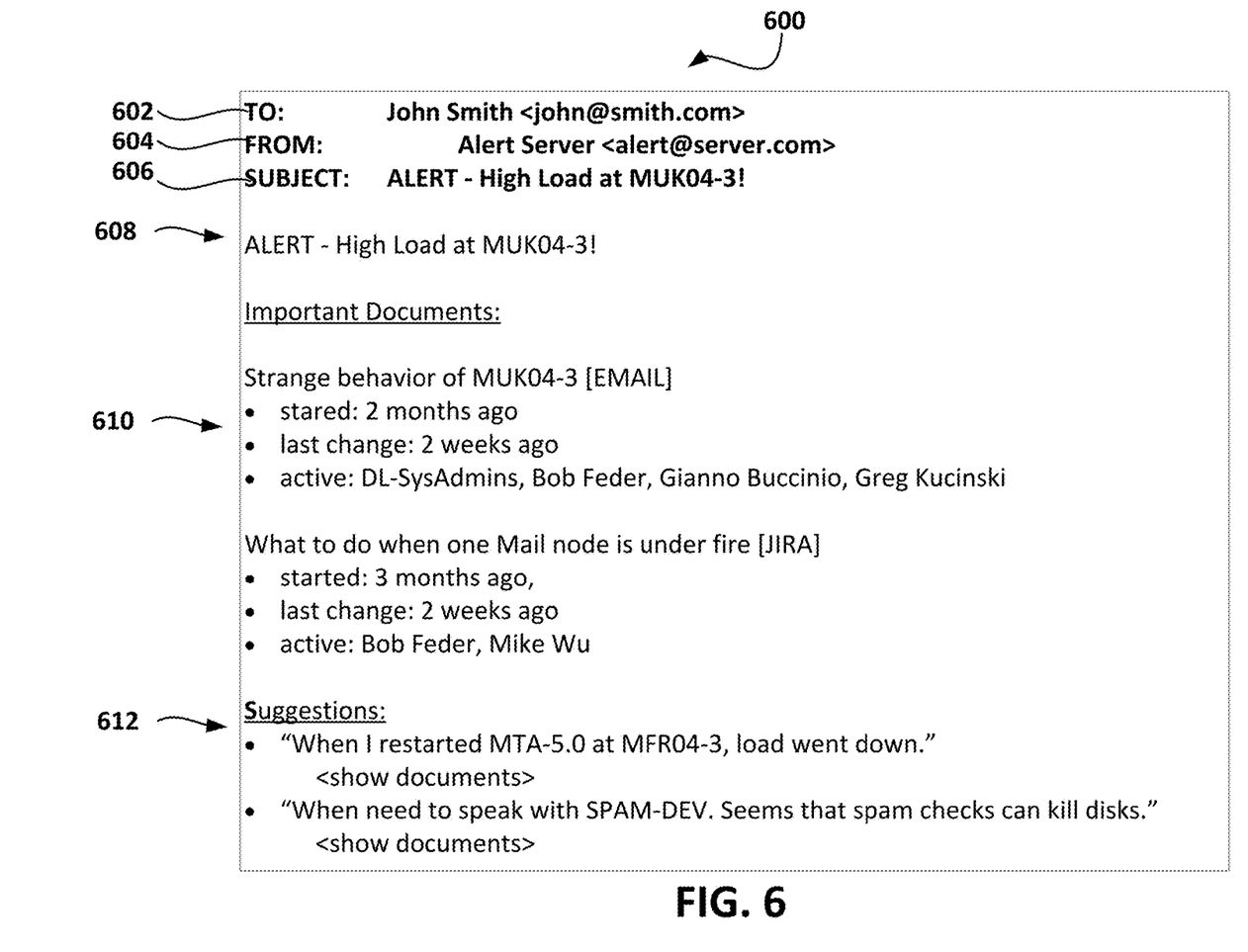
FIG. 6 is an example e-mail message.

FIG. 6 shows an example of an e-mail message 600 used to display condition data and one or more artifacts that are relevant to the condition data. The message includes fields that are commonly associated with e-mail messages, including sender information 602, recipient information 604, and subject information 606. The subject information 606 can include a brief summary of the message contents, for example, a summary of the condition data.

The message 600 can include information similar to the information displayed in the user interface 104a shown in FIG. 4. For instance, the message 600 can include a condition portion 608 that displays all of part of the condition data, an artifact portion 610 that displays one or more artifacts that are relevant to the condition data, and a suggestion portion 612 that displays suggestions to the user that are related to the condition data. The portions 608, 610, and 612 can be similar to that of user interface 104a, or they can be formatted in a manner that conforms to particular message formats or protocols. For example, in some implementations, the message 600 is similar to user interface 104a, but displays information using only plain text formatting so that is compatible with plain text e-mail applications. In another example, in some implementations, the message 600 is similar to the user interface 104a, but contains only a portion of the information displayed in the user interface 104a, in order to reduce the length and transmission size of the message 600. In some implementations, the message 600 includes a facility that enables a user viewing the message 600 to access the user interface 104a. For example, the message 600 could include a hyperlink that points to a network location of the user interface 104a.

In some implementations, the message 600 can be adapted to transmission according to other messaging protocols, and can be, for instance, an instant message, an e-mail message, an SMS message, an electronic notification, a social media message (i.e., a message transmitted using a social media network), or another type of message. In some implementations, the message 600 can include audio and/or video data. For instance, in some implementations, the message 600 can be an audio message, and includes spoken information concerning the condition data and the related artifacts. In some implementations, the message 600 can be transmitted by way of an audio channel, for instance a telephone connection, radio connection, or other connection capable of carrying auditory information.

Figure 7:
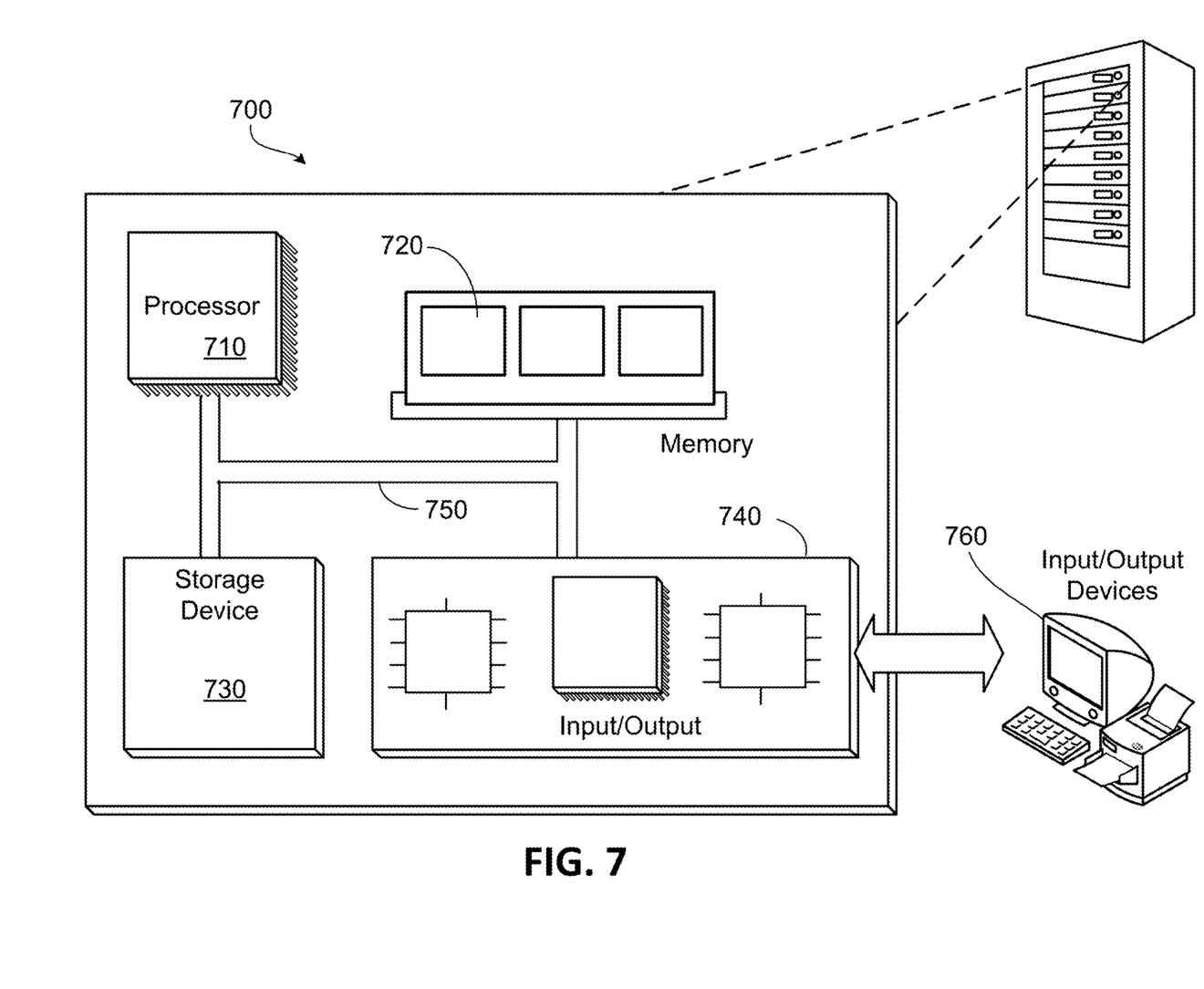

FIG. 7 is a block diagram of an example computer system 700. For example, referring to FIG. 1, client computers 102a-c, file servers 106a-b, remote systems 108a-b, monitoring systems 110a-b, search servers 122a-b, or a server forming a portion of cloud systems 124a-b could be an example of the system 700 described here, as could a computer system used by any of the users who access resources of client computers 102a-c, file servers 106a-b, remote systems 108a-b, monitoring systems 110a-b, search servers 122a-b, or cloud systems 124a-b. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In some implementations, the processor 710 is a single-threaded processor. In some implementations, the processor 710 is a multi-threaded processor. In some implementations, the processor 710 is a quantum computer. The processor 710 is capable of processing instructions stored in the memory 720 or on the storage device 730. The processor 710 may execute operations such as storing, maintaining, and displaying artifacts.

The memory 720 stores information within the system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the system 700. In some implementations, the storage device 730 is a non-transitory computer-readable medium. In various different implementations, the storage device 730 can include, for example, a hard disk device, an optical disk device, a solid-date drive, a flash drive, magnetic tape, or some other large capacity storage device. In some implementations, the storage device 730 may be a cloud storage device, e.g., a logical storage device including multiple physical storage devices distributed on a network and accessed using a network. In some examples, the storage device may store long-term data, such as the artifacts 120 or 202a-h or archives 118a-g or 204. The input/output device 740 provides input/output operations for the system 700. In some implementations, the input/output device 740 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. A network interface device allows the system 700 to communicate, for example, transmit and receive data such as artifacts 120 or 202a-h or archives 118a-g or 204 shown in FIG. 1. In some implementations, the input/output device can include driver devices configured to receive input data and send output data to other input/output devices, e.g., a keyboard, a mouse, a printer, a sensor (e.g., a sensor that measures component or system-related properties, a sensor that measures environmental-related properties, or other types of sensors), and a display device 760. In some implementations, mobile computing devices, mobile communication devices, and other devices can be used.

A server (e.g., a file server 106a-b, a monitoring system 110a-b, a search server 122a-b, a cloud system 124a-b, or a server forming a portion of the cloud system 124a-b shown in FIG. 1) can be realized by instructions that upon execution cause one or more processing devices to carry out the processes and functions described above, for example, storing, maintaining, and displaying artifacts. Such instructions can include, for example, interpreted instructions such as script instructions, or executable code, or other instructions stored in a computer readable medium. A file server 106a-b, a monitoring system 110a-b, a search server 122a-b, or a cloud system 124a-b can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although an example processing system has been described in FIG. 7, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as storing, maintaining, and displaying artifacts can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of nonvolatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g., a cloud system 124*a-b*) is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

What is claimed is:

1. A method comprising:
   receiving an indication of a condition at a first component of a computer system;
   performing a search of one or more archives that identifies, among artifacts of at least one of the one or more archives, information relevant to the condition, wherein the artifacts include one or more e-mail messages, social media messages, and chat messages, at least some of the artifacts including content generated by one or more users describing one or more prior instances of the condition experienced by the first component;
   determining, among the at least some of the identified artifacts, at least one artifact containing information describing how the condition was resolved during the one or more prior instances of the condition experienced by the first component; and
   displaying, in a user interface, information determined based on the at least one artifact in association with a visual representation indication of the condition, wherein
   only a subset of the determined information is displayed to a user via the user interface based, at least in part, on a predefined set of criteria governing relevancy of the information determined to be displayed,
   the predefined set of criteria comprises at least one of user-specified criteria including user: selected systems and/or conditions to be monitored and system-specified criteria including system-selected systems and/or conditions to be monitored,
   the user interface comprises a first portion that includes the information relevant to the condition, and a second portion that includes the subset of information determined based on the at least one artifact, the first and second portions are displayed simultaneously in the user interface, and the at least some of the identified artifacts to being relevant to an instance of the condition experienced by a second component of the computer system, the second component being identified as matching at least one similarity criterion to the first component.

2. The method of claim 1, further comprising:
identifying a facility at which a system administrator accesses notifications of conditions experienced by the computer system designated as managed by the system administrator, the facility being associated with the user interface;
receiving at least one notification designated for delivery to the facility; and
providing, the subset of information determined based on the at least one artifact to the facility in association with the at least one notification.

3. The method of claim 2, wherein the facility comprises an electronic message system and the user interface comprises an electronic message.

4. The method of claim 1, further comprising generating a search query based on keywords identified as relevant to the indicated condition.

5. The method of claim 4, further comprising submitting the search query to a search facility that searches the one or more archives.

6. The method of claim 4, further comprising displaying, in the user interface, a visual representation of the search query, the visual representation enabling a modification of the keywords of the search query.

7. The method of claim 4, further comprising displaying, in the user interface, controls that enable a user to save and recall the search query.

8. The method of claim 1, wherein the at least some of the identified artifacts include documentations describing the first component.

9. The method of claim 1, further comprising displaying, in the user interface, one or more users identified as associated with the at least some of the artifacts.

10. The method of claim 1, wherein an electronic message indicates the condition.

11. The method of claim 1, wherein the electronic message is an email message, a social media message, or an instant message.

12. The method of claim 1, wherein a telephone communication indicates the condition.

13. The method of claim 1, wherein at least one of the one or more archives is accessed using the Internet.

14. The method of claim 1, further comprising:
detecting the condition using a detection mechanism to determine the indication.

15. A non-transitory computer readable storage device storing a computer program product comprising machine-readable instructions that, when executed, cause a computer system to carry out operations comprising:
receiving an indication of a condition at a first component of a computer system;
performing a search of one or more archives that identifies, among artifacts of at least one of the one or more archives, information relevant to the condition, wherein the artifacts include one or more e-mail messages, social media messages, and chat messages, at least some of the artifacts including content generated by one or more users describing one or more prior instances of the condition experienced by the first component;
determining, among the at least some of the identified artifacts, at least one artifact containing information describing how the condition was resolved during the one or more prior instances of the condition experienced by the first component; and
displaying, in a user interface, information determined based on the at least one artifact in association with a visual representation indication of the condition, wherein
only a subset of the determined information is displayed to a user via the user interface based, at least in part, on a predefined set of criteria governing relevancy of the information determined to be displayed,
the predefined set of criteria comprises at least one of user-specified criteria including user-selected systems and/or conditions to be monitored and system-specified criteria including system-selected systems and/or conditions to be monitored,
the user interface comprises a first portion that includes the information relevant to the condition, and a second portion that includes the subset of information determined based on the at least one artifact, the first and second portions are displayed simultaneously in the user interface, and
the at least some of the identified artifacts being relevant to an instance of the condition experienced by a second component of the computer system, the second component being identified as matching at least one similarity criterion to the first component.

16. The non-transitory computer readable storage device of claim 15, the operations further comprising:
identifying a facility at which a system administrator accesses notifications of conditions experienced by the computer system designated as managed by the system administrator, the facility being associated with the user interface;
receiving at least one notification designated for delivery to the facility; and
providing, the subset of information determined based on the at least one artifact to the facility in association with the at least one notification.

17. The non-transitory computer readable storage device of claim 16, wherein the facility comprises an electronic message system and the user interface comprises an electronic message.

18. The non-transitory computer readable storage device of claim 15, the operations further comprising generating a search query based on keywords identified as relevant to the indicated condition.

19. The non-transitory computer readable storage device of claim 18, the operations further comprising submitting the search query to a search facility that searches the one or more archives.

20. The non-transitory computer readable storage device of claim 18, the operations further comprising displaying, in the user interface, a visual representation of the search query, the visual representation enabling a modification of the keywords of the search query.

21. The non-transitory computer readable storage device of claim 18, the operations further comprising displaying, in the user interface, controls that enable a user to save and recall the search query.

22. The non-transitory computer readable storage device of claim 15, wherein the at least some of the identified artifacts include documentations describing the first component.

23. The non-transitory computer readable storage device of claim 15, the operations further comprising displaying, in the user interface, one or more users identified as associated with the at least some of the artifacts.

24. The non-transitory computer readable storage device of claim 15, wherein an electronic message indicates the condition.

25. The non-transitory computer readable storage device of claim 15, wherein the electronic message is an email message, a social media message, or an instant message.

26. The non-transitory computer readable storage device of claim 15, wherein a telephone communication indicates the condition.

27. The non-transitory computer readable storage device of claim 15, wherein at least one of the one or more archives is accessed using the Internet.

28. The non-transitory computer readable storage device of claim 15, the operations further comprising detecting the condition using a detection mechanism to determine the indication.

29. A system comprising:
a computer system configured to:
receive an indication of a condition at a first component of the computer system;
performing a search of one or more archives that identifies, among artifacts of at least one of the one or more archives, information relevant to the condition, wherein the artifacts include one or more e-mail messages, social media messages, and chat messages, at least some of the artifacts including content generated by one or more users describing one or more prior instances of the condition experienced by the first component;
determine, among the at least some of the identified artifacts, at least one artifact containing information describing how the condition was resolved during the one or more prior instances of the condition experienced by the first component; and
display, in a user interface, information determined based on the at least one artifact in association with a visual representation indication of a condition, wherein
only a subset of the determined information is displayed to a user via the user interface based, at least in part, on a predefined set of criteria governing relevancy of the information determined to be displayed, wherein
the predefined set of criteria comprises at least one of user-specified criteria including user: selected systems and/or conditions to be monitored and system-specified criteria including system-selected systems and/or conditions to be monitored,
the user interface comprises a first portion that includes the information relevant to the condition, and a second portion that includes the subset of information determined based on the at least one artifact, the first and second portions are displayed simultaneously in the user interface, and
the at least some of the identified artifacts being relevant to an instance of the condition experienced by a second component of the computer system, the second component being identified as matching at least one similarity criterion to the first component.

30. The system of claim 29, the computer system further configured to:
identify a facility at which a system administrator accesses notifications of conditions experienced by the computer system designated as managed by the system administrator, the facility being associated with the user interface;
receive at least one notification designated for delivery to the facility; and
provide, the subset of information determined based on the at least one artifact to the facility in association with the at least one notification.

31. The system of claim 30, wherein the facility comprises an electronic message system and the user interface comprises an electronic message.

32. The system of claim 29, the system configured to generate a search query based on keywords identified as relevant to the indicated condition.

33. The system of claim 32, the system configured to submit the search query to a search facility that searches the one or more archives.

34. The system of claim 32, the system configured to display, in the user interface, a visual representation of the search query, the visual representation enabling a modification of the keywords of the search query.

35. The system of claim 32, the system configured to display, in the user interface, controls that enable a user to save and recall the search query.

36. The system of claim 29, wherein the at least some of the identified artifacts include documentations describing the first component.

37. The system of claim 29, the system configured to display, in the user interface, one or more users identified as associated with the at least some of the artifacts.

38. The system of claim 29, wherein an electronic message indicates the condition.

39. The system of claim 29, wherein the electronic message is an email message, a social media message, or an instant message.

40. The system of claim 29, wherein a telephone communication indicates the condition.

41. The system of claim 29, wherein at least one of the one or more archives is accessed using the Internet.

42. The system of claim 29, the system configured to detect the condition using a detection mechanism.

* * * * *